May 8, 1951

G. NAHMAN

METHOD OF FABRICATING A GENERALLY CYLINDRICAL MAGNETIC STRUCTURE 2,552,109

Filed Jan. 16, 1945

3 Sheets-Sheet 1

INVENTOR
Gustave Nahman
BY
Dean Fairbank & Hirsch
ATTORNEYS

May 8, 1951

G. NAHMAN

METHOD OF FABRICATING A GENERALLY CYLINDRICAL MAGNETIC STRUCTURE 2,552,109

Filed Jan. 16, 1945

3 Sheets-Sheet 2

INVENTOR
Gustave Nahman
BY
Dean Fairbank & Hirsch
ATTORNEY

May 8, 1951 G. NAHMAN 2,552,109

METHOD OF FABRICATING A GENERALLY CYLINDRICAL MAGNETIC STRUCTURE

Filed Jan. 16, 1945 3 Sheets-Sheet 3

INVENTOR
Gustave Nahman
BY
Dean Fairbank & Hirsch
ATTORNEYS

Patented May 8, 1951

2,552,109

UNITED STATES PATENT OFFICE 2,552,109

METHOD OF FABRICATING A GENERALLY CYLINDRICAL MAGNETIC STRUCTURE

Gustave Nahman, Englewood, N. J.

Application January 16, 1945, Serial No. 572,987

2 Claims. (Cl. 29—155.61)

The present invention relates to electro-magnetic frames, fields, cores and the like of the type used in electric transformers, motors, relays, switches and other electro-magnetic devices.

While laminated cylindrical iron structures theoretically provide the most efficient magneto-motive circuits, their use has imposed obstacles due to the cost and difficulty of assembling the required multiplicity of such laminations radially of the cylinder, bearing in mind that progressively greater thickness of laminations is required from the core to the periphery. This difficulty of assembly accounts to considerable extent for the use by the art of rectangular magnetic structures, since the laminations may thus be easily assembled in superposed relation.

It is an object of the invention to provide a simple, expeditious and inexpensive procedure for disposing plies of uniform thickness in generally radial relation for producing a cylindrical magnetic structure that combines the advantages of such cylindrical form with the economy of assembly heretofore attained only by the use of rectangular structures.

According to the present invention, a single length of magnetic strip is transversely pleated alternately from opposite sides thereof at intervals determining intervening panel pairs of equal length, arranged in recurring cycles varying from a maximum to a minimum length. When one end of the thus pleated strip is moved toward the fixedly held opposite end, the strip becomes automatically folded back and forth in plies accordion fashion which, depending on the arrangement of the panels will have a progressively lesser number of plies per unit of arc at the inner than at the outer periphery of the cylindrical structure to be formed from the folded strip, thereby making allowance for the differences in circumferential lengths thereof at such regions. Where the ribbon is of extremely thin and flexible stock it is preferably undulated between transverse pleats to impart sufficient stiffness to become folded or plied as set forth, the undulations being preferably so arranged as to become nested.

Contemporaneously with the pleating action, the strip may also be stamped out to afford accommodation for the electro-magnetic coil, the stamped out openings being so disposed as to register in the folded strip and in the cylindrical structure formed therefrom. In one embodiment the finished core thus made may be transversely severed to afford annular troughs in the two segments for coil accommodation. In another embodiment, the ribbon may be slit longitudinally alternately along opposite edges of the stamped out rectangular apertures, to permit direct separation of the cylindrical structure formed therefrom into two segments which may be again pushed together for reassembly after insertion of the electro-magnetic coil.

Figure 1:
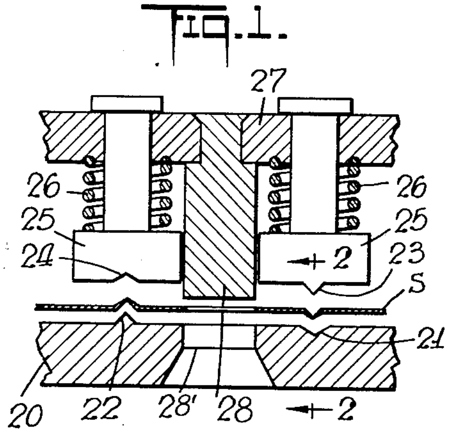
Figure 2:
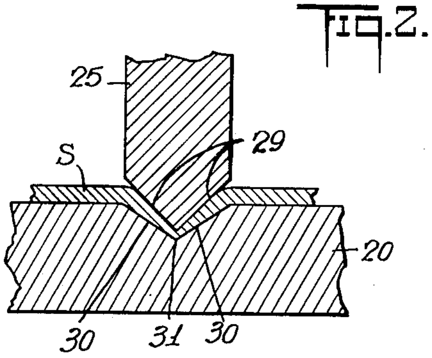
Figure 3:
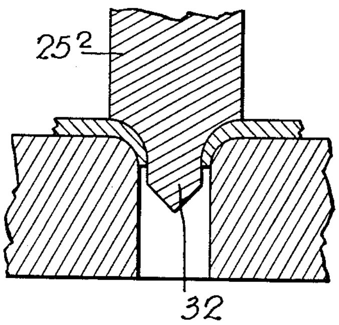
Figure 3A:
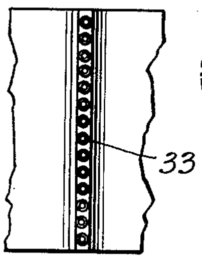
Figure 4:
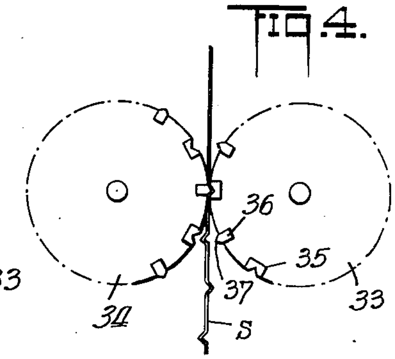
Figure 6:
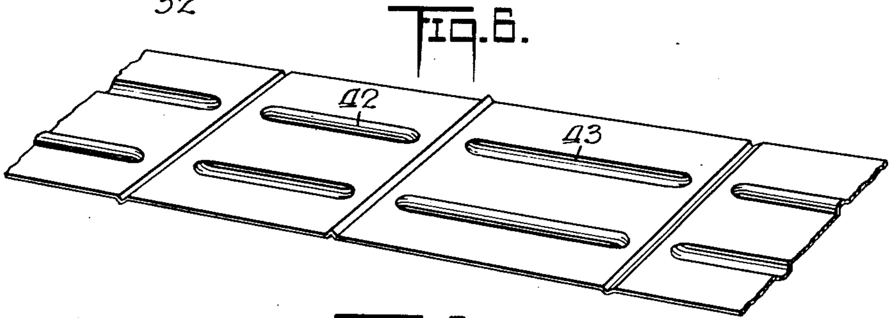
Figure 5:
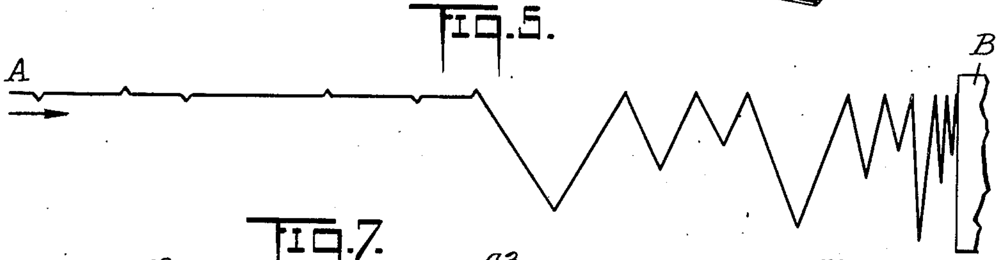
Figure 7:
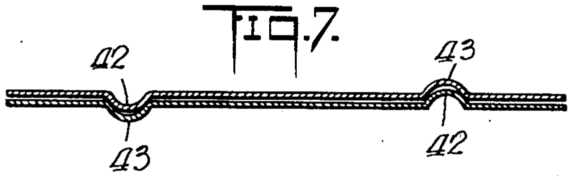
Figure 8:
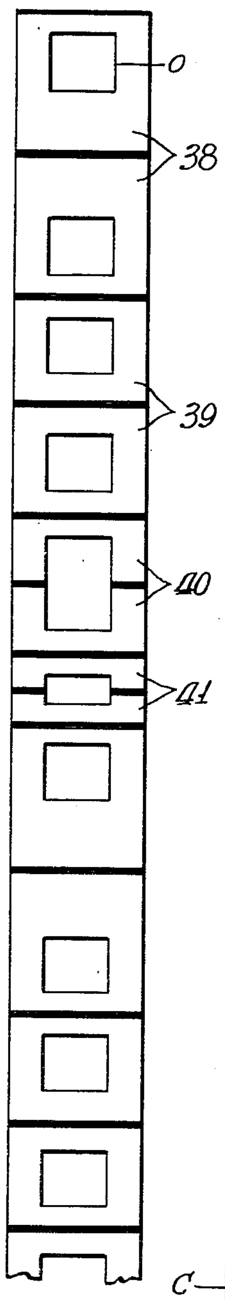
Figure 9:
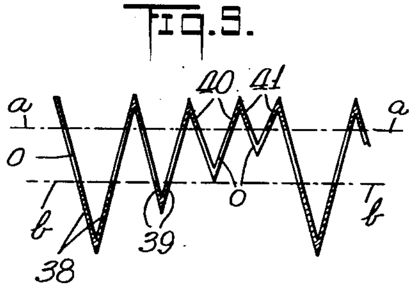
Figure 10:
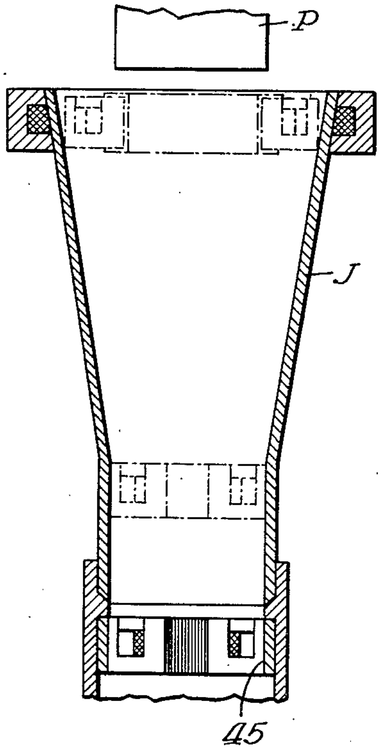
Figure 11:
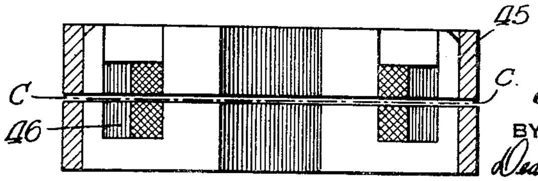
Figure 14:
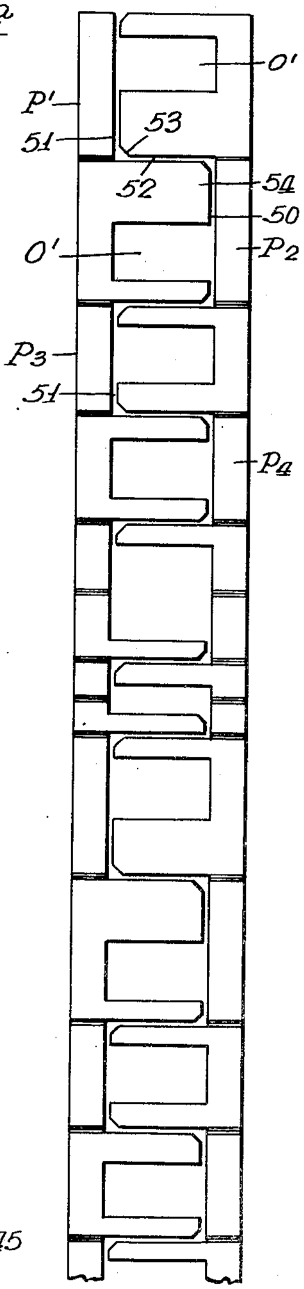
Figure 12:
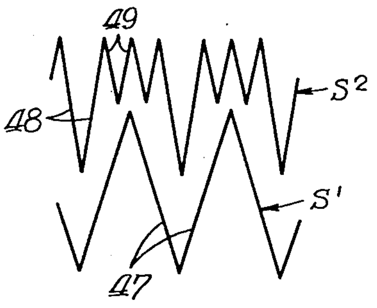
Figure 13:
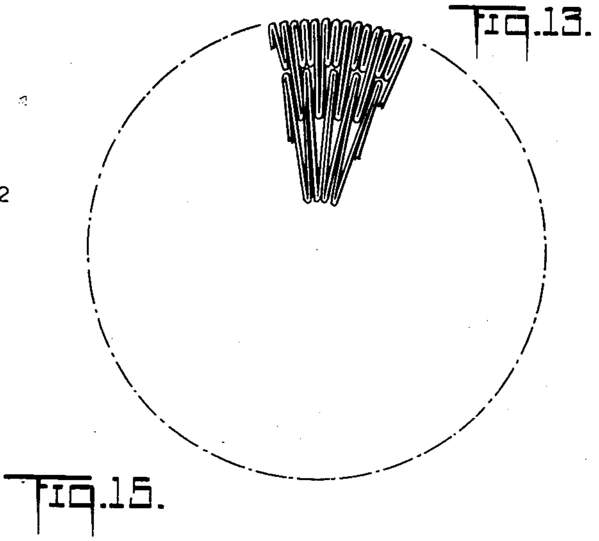
Figure 15:
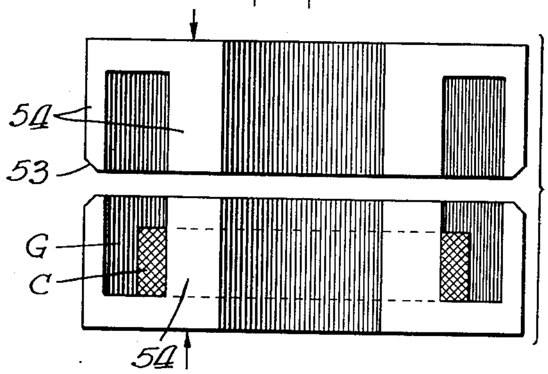
Figures 16, 17:
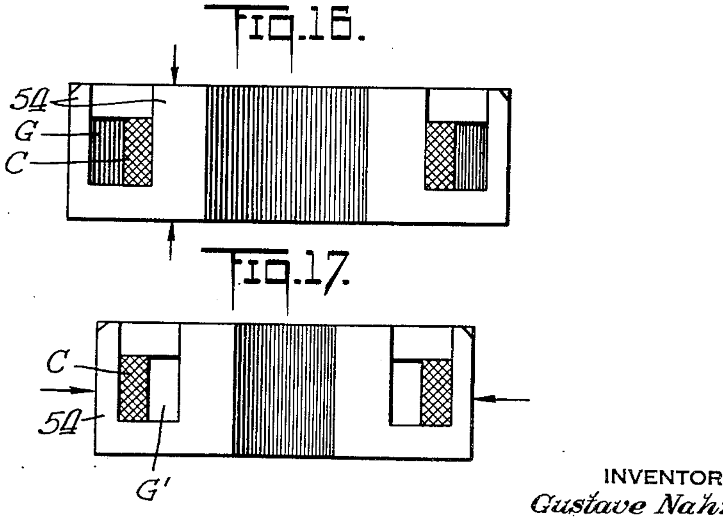

In the accompanying drawings in which are shown one or more of various possible embodiments of the several features of the invention, Fig. 1 is a view in longitudinal cross-section showing one arrangement for treating the magnetic ribbon, Fig. 2 is a view in longitudinal cross-section on a greatly enlarged scale taken on line 2—2 of Fig. 1, Fig. 3 is a view similar to Fig. 2 of a modified form, Fig. 3*a* is a fragmentary plan of the product made by the punch of Fig. 3, Fig. 4 is a view, more or less diagrammatic, showing another arrangement for pleating the ribbon, Fig. 5 is a more or less schematic diagrammatic view of the method of folding the ribbon into a pleated structure, Fig. 6 is a diagrammatic view indicating the detail of the undulated arrangement of the ribbon, Fig. 7 is a view in longitudinal cross-section of a fragment of the folded ribbon, Fig. 8 is a plan view of the particular form of stamped out ribbon made by the construction of Fig. 1, Fig. 9 is a cross-sectional view of the partly folded ribbon of the embodiment of Fig. 8, Fig. 10 is a diagrammatic view in longitudinal cross-section indicating the mode of assembly of the embodiment of Figs. 8 and 9, Fig. 11 is a view in longitudinal cross-section and on a larger scale of the assembled structure produced in the fixture of Fig. 10, after severing said structure, Fig. 12 is a diagrammatic view in longitudinal cross-section showing the mode of intermeshing two distinct cylindrically compressed strips for making a core of larger diameter, Fig. 13 is an end view of the completed structure of Fig. 12, Fig. 14 is a view similar to Fig. 8 indicating another arrangement of cutting a magnetic ribbon, and Figs. 15, 16 and 17 are diagrammatic views indicating the mode of reassembling the core pieces made from the two segments of strip shown in Fig. 14 after introducing the coil therebetween.

Referring now to the drawings, there is shown in the embodiment of Fig. 1 a fixed bed 20 having alternate transverse V-shaped depressions 21 and corresponding V-shaped ridges 22 which coact respectively with ridges 23 and depressions 24 in punches 25 spring retained at 26 against the moving carrier plate 27 which mounts as many as 20 of said punches properly spaced, as hereinafter set forth. Cutting punches 28 for making rectangular openings in the strip are interposed between successive punches and they push the cut out pieces through corresponding apertures 28′ in the bed 20.

Thus the metal strip S interposed between the bed 20 and the punches 25, 28 will be simultaneously punched with alternate pleats extending from opposite sides as shown and will also be blanked out by the cutting punches 28 all in the sequence of spacing determined by the position of said various punches. Obviously the strip is to be fed forward after each punching and pleating operation to repeat the operation, until the entire length of strip has thus been treated. A segment of a typical strip prepared as set forth is shown in Fig. 8.

In Fig. 2 is shown a detail view of pleating punch 25 which as will be noted has a sharper angle between its sides 29 than between the sides 30 of the groove 21 in the bed 20, so that in the punching operation the metal stock will be compressed at the apex 31 to a minimum thickness, the thickness of the metal progressively increasing on the flanks of the pleat as shown. In the embodiment of Fig. 3, an alternative arrangement of punch $25^2$ is shown, which has small points 32 that perforate the metal at 33 as shown in Fig. 3*a*. In each of these embodiments the direction in which the fold of the strip will occur is thus predetermined.

In Fig. 4 is shown another embodiment in which the pleating of the strip is effected by passing the same between two rollers 33 and 34. Each roller has a series of peripheral grooved insets 35 longitudinally of the cylinder and other insets 36 each of which has a protruding wedge 37. The wedges and grooves on the respective rollers are arranged to intermesh and to produce pleats alternately protruding from opposite faces of the strip S. In this embodiment the blanking out of apertures is preferably performed in a separate operation.

In the preferred arrangement of pleats the intervening panels of each pair are equal in length, but successive pairs progressively decrease in length from a maximum to a minimum in recurring cycles. Thus for instance, as shown in Figs. 8 and 9, each cycle is made of four pairs of panels, a pair 38 of maximum length, a pair 39 of lesser length, a pair 40 of still lesser length and a pair 41 of minimum length.

Referring to Fig. 5 the strip is simply pushed from one end A toward the opposite end B which is held fixed as best shown in Fig. 5. In this operation the strip will automatically fold up accordion fashion, along the transverse lines determined by the pleating operation in a multiplicity of plies extending alternately back and forth.

Where the structure of the ribbon is so thin and flimsy that the panels between pleats would lack the stiffness to collapse accordion fashion as indicated, it is preferred to undulate the stock transversely as best shown at 42 and 43 in Fig. 6 from opposite sides of each transverse fold. Such undulations 42, 43 may be imparted to the stock in the same operation as the transverse pleating operation, as will be readily understood. These undulations of course impart sufficient stiffness to permit the accordion folding operation shown in Fig. 5 and in the finished construction these undulations, extending as they do from alternately opposite sides will nest as best shown in Fig. 7.

Referring now again to Figs. 8 and 9, the rectangular openings O cut into the strip are of equal width and nearer the outermost pleats of the strip and are so arranged that when the ribbon is folded as best shown in Fig. 9, the outer edges of the openings O will register along line *a—a* and the inner edges on the longer panels also register as shown along line *b—b*. The shorter panels not reaching the line *b—b*, the rectangular openings O in such shorter panels extend across the pleat between each such shorter panel pair.

As shown in Fig. 10, the accordion folding strip prepared as above set forth, is curved into a wreath and introduced into the wider upper opening of a frusto-conical forming jig J and then pushed downward by the plunger P and in this operation the plies are pressed together as is readily understood. The arrangement of plies in radial lengths varying in recurring cycles as shown, affords a maximum number of plies per unit of arc at the exterior, progressively decreasing to a minimum number of such plies at the interior periphery of the cylindrical structure formed. Thus, allowance is made for the progressive decrease in circumferential length from the outer to the inner periphery of the cylindrical structure.

As best shown in Fig. 11, the completed structure delivered from the forming jig into the holder 45 may be divided in half along the line *c—c* to provide two cores, each with an annular trough 46 for accommodating an electromagnetic coil (not shown).

In Figs. 12 and 13 is shown one particular arrangement in which two strips are folded according to the principle indicated above and intermeshed. One of said strips S′ is illustratively folded at uniform intervals to form a sequence of identical panel pairs 47 and the other strip $S^2$ at intervals which include recurring long panel pairs 48, and an intervening plurality of shorter panel pairs 49. The two strips are intermeshed as best shown in Fig. 12 so that the longer plies 48 of the outer strip $S^2$ extend between the plies 47 of the inner strip S′. When the ends of the two strips are then brought together for assembly in a forming jig similar to that of Fig. 10 the two strips will intermesh as best shown in Fig. 13 to form an electro-magnet core of large diameter.

In the embodiment of Fig. 14, an other arrangement is shown alternative to that of Fig. 8 for producing a magnetic core structure. In this embodiment the strip is slitted longitudinally as at 50 along alternate panels $P_2$, $P_4$, etc., and nearer one longitudinal edge of the strip. The intervening panels $P_1$, $P_3$, etc. are similarly slit longitudinally at 51 nearer the opposite longitudinal edge of the strip. These slits extend along longitudinal edges of the rectangular cut-outs O′ in the several panels, the sets of slits 50 to the right and slits 51 to the left of the medianly arranged cut-outs O′.

The ends of each two consecutive longitudinal slits 50, 51 that are aligned along a transverse pleat are connected by a transverse slit 52, so that the strip is longitudinally cut in two by a continuous zigzag slit. Desirably the slits are widened as at 53 to the corners thereof for convenience of assembly, as hereinafter set forth.

The slit ribbon of Fig. 14 is folded accordion fashion in the manner shown in Fig. 5, so that the various rectangular cut-outs O′ come into registry with each other in the manner previously described in connection with Figs. 8 and 9. After the folded strip has been closed into a cylinder of larger than the minimum possible diameter, the cylindrical structure may be axially pulled apart, since the strip is longitudinally cut in two. Thus there will be formed two cylindrical structures each of which has radiating ridges 54 spaced from each neighboring ridge by the thickness of the corresponding ridge of the companion structure previously interposed therebetween. The electro-magnetic coil C may be readily disposed in the annular groove G across and in the protruding ridges 54 of either of the cylindrical structures. That coil is preferably of radial thickness less than the radial width of the annular groove G determined by the rectangular cut-outs and snugly embraces the inner periphery of the annular groove as shown in Fig. 15.

The companion cylindrical structure is then applied as best shown in Fig. 16 for its radiating ridges to intermesh with those of the first structure, and to straddle the coil C. By reason of the cut away corners 53 such assembly is facilitated. Thereupon the composite unit is passed through a forming jig such as that of Fig. 10 and reduced in diameter until the plies are compacted and the outer periphery of the coil C contacts the outer periphery of the cavity G′ formed from the grooves G, whereupon the construction is completed.

It will be understood that the spaces in the magnetic structure of each embodiment may be filled with metal or metal bearing composition, usually magnetic powder mixed with resin substantially in the manner indicated in the companion application, Serial No. 568,098, filed December 14, 1944, now Patent 2,516,140.

While in most cases the structure of the present invention will be of circular cylindrical form, it is understood that it is within the scope of the invention, as defined in the claims by the words "generally cylindrical" to make it of elliptical or oval cylindrical form and of curved contour more generally, and likewise, that for certain special applications, the structure may be rounded in axial cross-section.

As many changes could be made in the above construction and method, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. The method of fabricating a generally cylindrical magnetic structure, which consists in transversely pleating an elongated strip of magnetic sheet material in alternate directions determining panels therebetween, while stamping out of the material openings of uniform width to register laterally and at one transverse edge of said openings, when the strip is folded along the line of its pleats, then while retaining one end of the strip, advancing the other end thereof, thereby to cause the strip to be folded in plies extending back and forth in the directions determined by said pleats, conforming the folded strip into a cylindrical structure and then dividing said structure into two cylindrical structures of lesser thickness, each with an annular groove therein determined by the apertures originally stamped in the strip.

2. The method of fabricating a generally cylindrical magnetic structure from a strip of thin metal, which consists in transversely pleating the metal in alternate directions at intervals determining intervening panels each pair of which is of equal length, but the pairs being arranged in recurring cycles varying from a maximum to a minimum length of panel, and simultaneously stamping from out of the sheet metal rectangular openings of equal width, the openings in the narrower panel pairs being traversed by the pleats, the wider panels each having a separate opening at the same distance from the outer pleat as the corresponding edge of the opening on the adjacent narrower pleat, and then while retaining one end of the strip, advancing the other end thereof, thereby to cause the strip to be folded in plies extending back and forth in the directions determined by said pleats, whereby in the pleated structure the openings will substantially register, forming the pleated strip into a cylindrical structure and transversely dividing the annulus to form two cylinders, each with an annular cavity therein.

GUSTAVE NAHMAN.

REFERENCES CITED

The following references are of record in the file of this patent:

UNITED STATES PATENTS

| Number | Name | Date |
|---|---|---|
| 268,010 | Goehler | Nov. 28, 1882 |
| 1,062,244 | Loy | May 20, 1913 |
| 1,225,730 | Gargiulo | May 8, 1917 |
| 1,365,569 | Troy | Jan. 11, 1921 |
| 1,543,001 | Gaynor | June 23, 1925 |
| 1,668,508 | Kettering | May 1, 1928 |
| 1,823,475 | Scudds | Sept. 15, 1931 |
| 1,860,820 | Scott | May 31, 1932 |
| 1,910,020 | Le Boutillier | May 23, 1933 |
| 1,976,929 | Elliot | Oct. 16, 1934 |
| 2,047,337 | Sutton | July 14, 1936 |
| 2,103,142 | Bowers | Dec. 21, 1937 |
| 2,302,571 | Ray | Nov. 17, 1942 |
| 2,370,702 | Yoder | May 6, 1945 |
| 2,378,661 | Salzer | June 19, 1945 |
| 2,422,810 | Tiedemann | June 24, 1947 |